W. C. BAKER.
BEARING.
APPLICATION FILED JAN. 16, 1919.
1,365,763.
Patented Jan. 18, 1921.
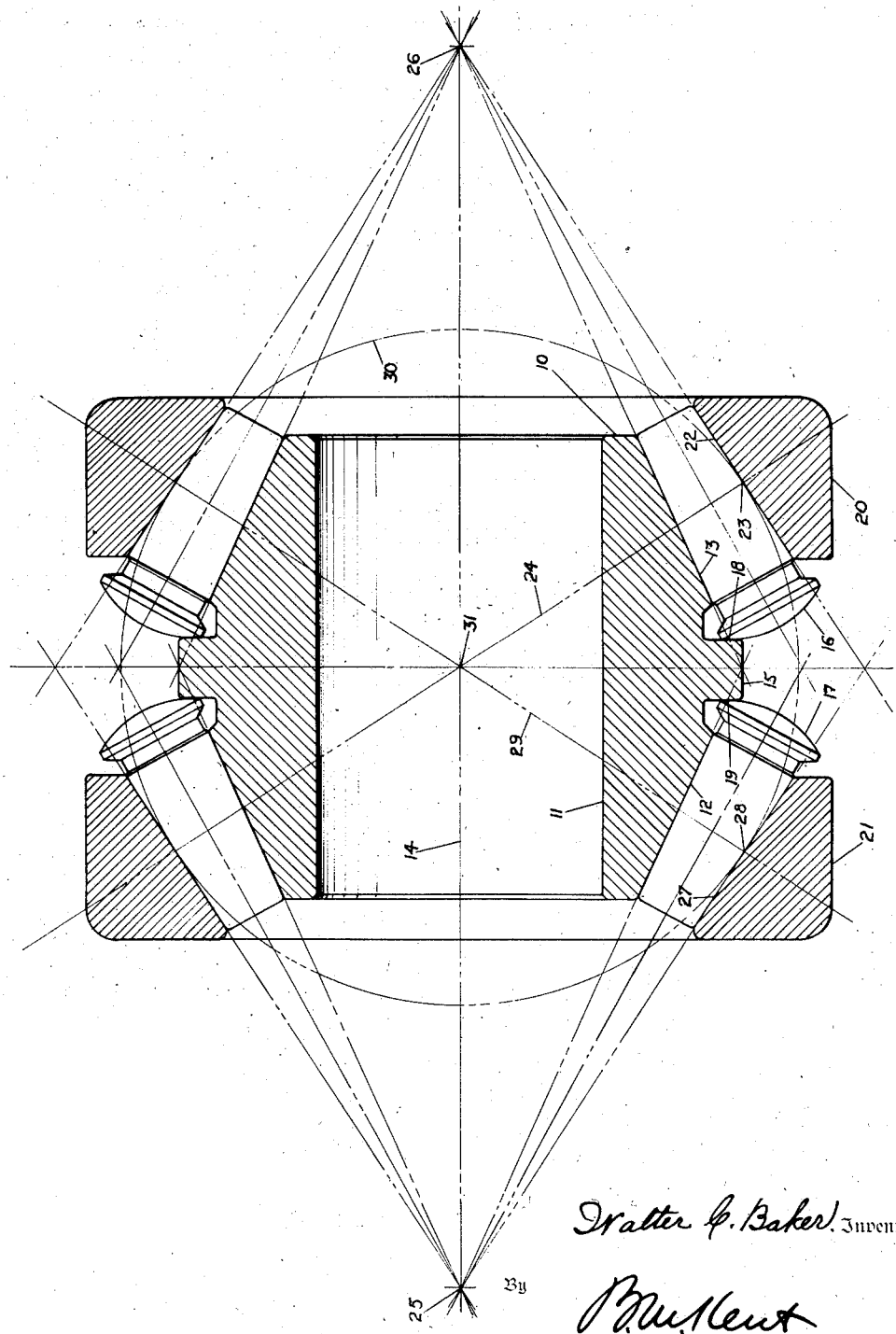
Walter C. Baker, Inventor
By
Attorney

UNITED STATES PATENT OFFICE.

WALTER C. BAKER, OF CLEVELAND, OHIO, ASSIGNOR TO THE STANDARD PARTS COMPANY, OF CLEVELAND, OHIO, A CORPORATION OF OHIO.

BEARING.

1,365,763.   Specification of Letters Patent.   Patented Jan. 18, 1921.

Application filed January 16, 1919. Serial No. 271,454.

*To all whom it may concern:*

Be it known that I, WALTER C. BAKER, a citizen of the United States, and a resident of Cleveland, county of Cuyahoga, State of Ohio, have invented certain new and useful Improvements in Bearings, of which the following is a specification.

This invention relates to roller bearings and more especially to conical roller bearings.

It is one of the objects of the invention to provide a conical roller bearing that will be capable of taking axial thrust in either direction and will also accommodate itself to slight disalinements of the shaft and the member in which it rotates.

Other objects and the features of novelty will be apparent from the following description taken in connection with the accompanying drawing, which is a longitudinal section through a bearing embodying my invention.

Referring to the drawing, 10 indicates the inner race member which is provided with a bore 11 and with conical external surfaces 12 and 13, each of which surfaces constitutes a race for a series of rollers. The surfaces 12 and 13 are oppositely arranged and, as is indicated by the broken lines, these surfaces have their apices on the axis 14 of the bearing. Between the surfaces 12 and 13, there is a radial flange, or collar, 15 against which the heads of the rollers 16 and 17 bear. The series of rollers 16 bear against one side of the collar 15 on the circle 18, which is a projection of the surface 13, and the rollers 17 bear against the opposite side of the collar 15 on the circle 19, which is a projection of the surface 12.

Outer race members 20 and 21 are arranged, respectively, on the series of rollers 16 and 17 and the outer member 20 has its inner surface 22 so inclined that the middle point 23 thereof will be normal to the line 24 which intersects the axis 14, midway between the points 25 and 26. In a similar manner, the inner surface 27 of the member 21 is so inclined that its middle point 28 is normal to the line 29, which intersects the axis 14 at the same point as the line 24. I have shown on the drawing a circle 30, which, it will be observed, is tangent to the surfaces 22 and 27 at the points where these surfaces are intersected by the lines 24 and 29.

It will be apparent from the foregoing description, and the drawing, that the bearing which I have invented is capable of taking thrust in both directions and on account of the relation between the surfaces 22 and 27 and the lines 24 and 29, the bearing will accommodate itself to slight disalinements by a rocking of the inner member 10 about the point 31 and that such slight disalinements will not unduly stress the rollers of either of the series 16 or 17.

Having thus described my invention, what I claim is:

1. In roller bearings, the combination of an inner race member having oppositely arranged conical roller surfaces and an integral collar therebetween, two outer race members with conical interior rolling surfaces which at the middle are normal to lines which intersect on the bearing axis midway between the apices of said oppositely arranged conical rolling surfaces, two series of conical rollers between said inner and outer race members, and each of said rollers having a thrust surface at its large end contacting with said collar, the rollers of one series contacting with one side of the collar and the rollers of the other series contacting with the other side of the collar.

2. In roller bearings, the combination of an inner race member having oppositely arranged conical rolling surfaces and an integral collar therebetween, two outer race members with conical interior rolling surfaces which at the middle are tangent to a circle drawn about a center on the axis of the bearing midway between the apices of said oppositely arranged conical rolling surfaces, two series of conical rollers between said inner and outer race members, and each of said rollers having a thrust surface at its large end contacting with said collar, the rollers of one series contacting with one side of the collar and the rollers of the other series contacting with the other side of the collar.

In testimony whereof I affix my signature.

WALTER C. BAKER.